Oct. 21, 1969  J. D. GESSIC  3,473,782
COUPLING DEVICE
Filed Nov. 23, 1966

INVENTOR
JOHN D. GESSIC

BY Oberlin, Maky & Donnelly
ATTORNEYS

United States Patent Office

3,473,782
Patented Oct. 21, 1969

1

3,473,782
COUPLING DEVICE
John D. Gessic, Chardon, Ohio, assignor of one-half to
Cullen B. Crawford, Cleveland, Ohio
Filed Nov. 23, 1966, Ser. No. 591,548
Int. Cl. F16l 37/28, 55/00, 37/18
U.S. Cl. 251—149.6                    5 Claims

ABSTRACT OF THE DISCLOSURE

A coupling including a body member having a valve member axially slidably received therein, and adapted to be retained in male and female positions by locking means adjacent opposite ends of the body member. When the valve member is in the female position, one of the locking means is free to releasably engage the end of another valve member inserted into the body member for coupling two couplings together.

---

This invention relates generally as indicated to a coupling device, and more particularly to a coupling containing a valve therein and which is capable of use as either a male or female unit.

Pipe couplings are, of course, widely used in many and varied operations wherever it is necessary to connect adjoining pipes or conduits or other members of a fluid system. In many such operations, the coupling includes a valve for control of the flow of fluid therethrough, and it is likewise common to utilize a pair of couplings with mating male and female valve units to provide for fluid flow in either direction as desired. One disadvantage of such couplings is that heretofore different types of couplings with different parts have had to be used to provide the male and female units, which accordingly makes it necessary to store the different couplings and parts to insure that the proper coupling and/or part is available when needed for replacement or repair.

It is accordingly an object of the present invention to provide a coupling for use with pipes, conduits, copper tubing and the like which is capable of being used as either a male or female unit.

Moreover, the previously known couplings have generally consisted of a number of complex parts to insure that sufficient pressure will be exerted on the valve unit to control the fluid flow therethrough. It is accordingly another object of the present invention to provide a coupling which consists of only a few parts and which may be easily and conveniently manufactured.

Another object of the present invention is the provision of a coupling which is capable of being used in combination with a second coupling of identical design, or alternatively which may be used as a coupling by itself.

Still another object of this invention is the provision of a coupling which may be coupled to itself in a simple and effective manner.

Other objects, features and advantages of this invention will be apparent to those skilled in the art after a reading of the following more detailed description.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

The above and other objects are achieved by this invention in the provision of a unique coupling device which includes a body member with a central opening extending therethrough, and a valve which is slidably receivable within the body member and capable of being selectively positioned in the female or male position. As will be appreciated from the more detailed description which follows, such coupling is capable of being readily converted into a female or male unit with a minimum of time and effort.

Figure 1:
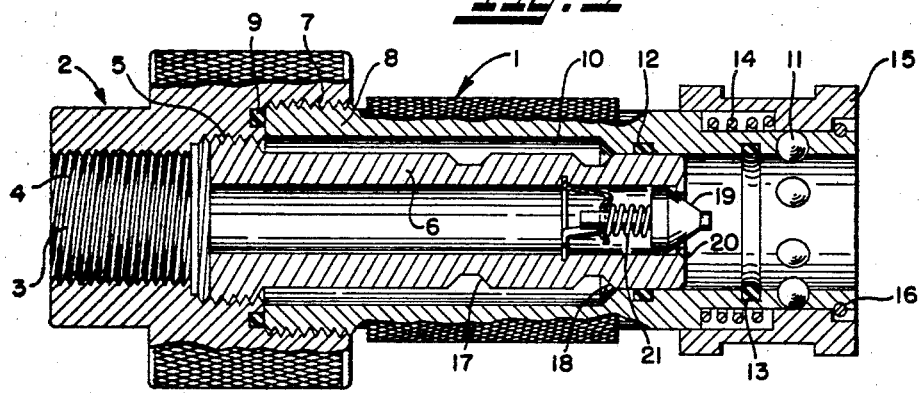
FIG. 1 is a plan view in section illustrating the coupling of this invention with the valve in the female position.
Figure 2:
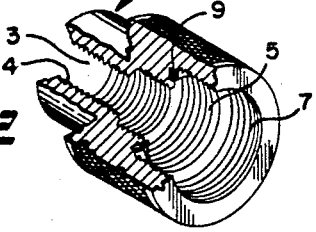
FIG. 2 is a cutaway perspective view of one member of the coupling.

Referring more particularly to FIGS. 1 and 2 of the drawing, the coupling is illustrated generally by the numeral 1 and comprises an end cap 2 which has a substantially central opening or bore 3 extending therethrough. The opening is threaded as at 4 for engagement of the coupling with an adjoining pipe or conduit within a fluid system.

The end cap, as shown more clearly in FIG. 2, preferably has a first threaded interior section 5 into which the valve member 6 may be threadedly engaged. The end cap has a second threaded section 7 for attachment to the body member and also preferably includes an annular sealing ring 9.

As shown in FIG. 1, when the valve is in the female position, it is connected to the end cap and body member 8 is also attached thereto. The body member has a central opening 10 which is in substantial alignment with opening 3 in the end cap and also includes a plurality of locking balls 11 positioned around the interior of the opening to lock the valve unit in the male position or to couple to another coupling as will be described more completely hereinafter. Annular sealing rings 12 and 13 are provided on the interior surface of the body member to provide a more effective seal for the coupling, and an annular spring 14 is included to retain sleeve 15 in its forward position, thereby exerting pressure on balls 11. A metal ring 16 is provided on the outer surface of the body member to retain sleeve 15 thereon.

The valve unit 6 includes at least one annular groove 17 and preferably a plurality of such grooves 17 and 18, about its outer circumference for a purpose which will be explained. The valve is of the type which includes a valve stem 19 normally held in engagement with valve seat 20 by resilient spring means 21 until sufficient pressure is exerted by the incoming fluid to open the valve and permit flow through the coupling.

As illustrated in FIG. 1, when the valve unit is in the female position, the valve is connected to the end cap and the valve body is likewise threadedly attached thereto. To convert the coupling to one with the valve in the middle position, it is only necessary to disconnect the valve and body member from the end cap and to push valve 6 forwardly in the body member to such position where the locking balls 11 are securely engaged in annular groove 17. This is the position of the coupling illustrated in FIG. 3 of the drawing.

To convert the coupling back to one with the valve in the female position, the reverse procedure is followed. The body member and end cap are disassembled, and pressure is applied to the end of the valve 6, as sleeve 15 is moved against spring 14, thus causing locking balls 11 to release the valve unit and to permit it to slide axially with respect to the body member. The coupling can be reassembled by connecting the valve member to the end cap and thereafter attaching the body member thereto as shown in FIG. 1.

Figure 3:
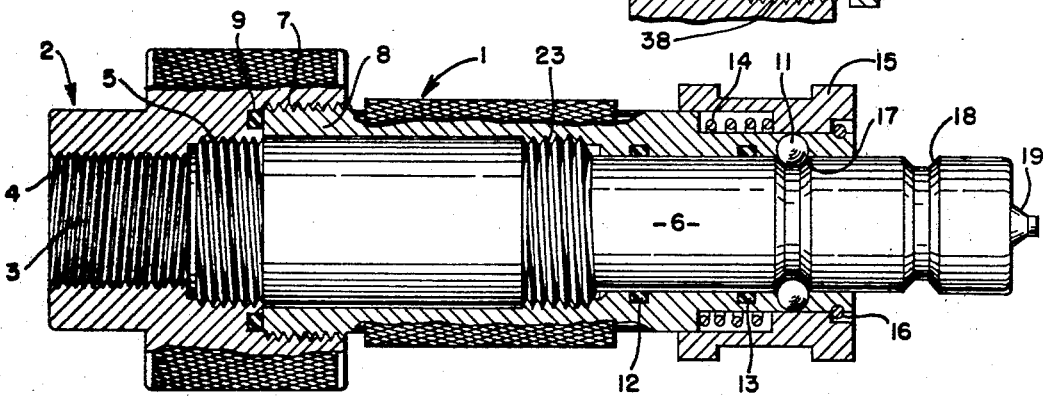
FIG. 3 is a plan view in section of a slightly modified form illustrating the valve unit in the male position.

A slightly modified form of the invention is also illustrated in FIG. 3 in which means 23, which are preferably threads, are provided in the forward portion of the bore in body member 8, whereby the valve member may be more firmly secured when in the male position. It will also be appreciated that such means 23 could extend the entire length of the passage, if desired.

Figure 4:
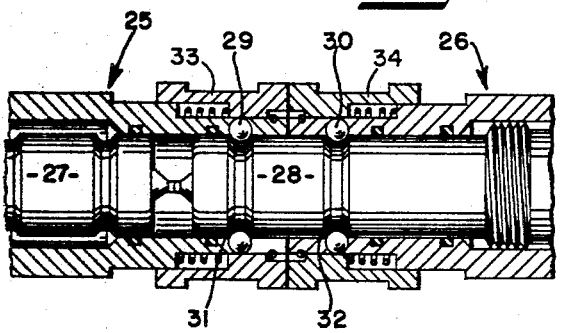
FIG. 4 is a composite view showing two couplings coupled together.

Referring now particularly to FIG. 4, the coupling is shown coupled to itself, that is two couplings 25 and 26 are illustrated coupled together with the first coupling having a valve 27 in the female position and coupling 26 having valve 28 in the male position. As thus shown, the two valves are in end to end engagement and are retained in such position by locking balls 29 and 30 positioned in annular grooves 31 and 32 of valve 28 in the male position. The two couplings may be uncoupled simply by moving sleeve 33 or 34 to release locking balls 29 or 30 and applying a pulling force to one of the couplings, while maintaining the other stationary.

Figure 5:
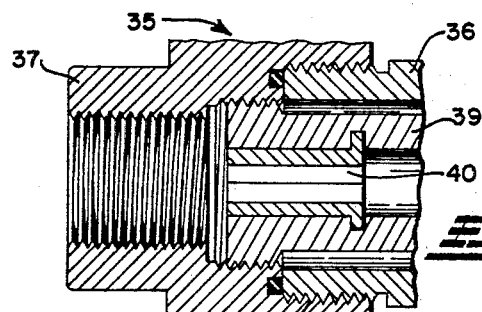
FIG. 5 is a fragmentary plan view in section illustrating a further embodiment of the invention.

In FIG. 5, a particularly advantageous form of the invention is illustrated in which coupling 35 has a body member 36 therein connected to end cap 37 at 38 as in the previously described embodiments. Valve member 39, however, has an opening 40, which is preferably in the form of a hexagon, into which an Allen wrench or the like may be inserted to transform the valve unit from the female to the male position or vice versa without disassembling the coupling. As will be appreciated, this may be accomplished simply by inserting the appropriate tool into opening 40, rotating the tool and valve member 39 until the valve is disconnected from the end cap, and thereafter moving the valve forwardly within the body member with the tool, while pulling the annular sleeve to release the circumferentially disposed locking balls until the first annular groove of the valve unit has moved forwardly within the passage past the locking balls. The sleeve may thereafter be released so that when the locking means comes in contact with the second groove it will automatically lock the valve in place. This embodiment may also, of course, include additional securing means for the valve unit in its forward position such as illustrated in FIG. 3.

Figure 6:
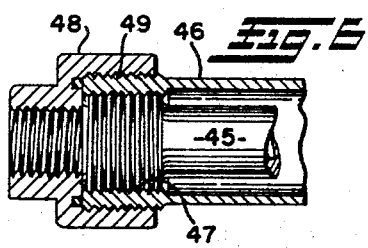
FIG. 6 is a fragmentary plan view in section on a reduced scale illustrating a modified form of the invention.

FIG. 6 illustrates another modified form of the invention in which valve member 45 is connected in a female position to body member 46 at 47. The body member is connected to end cap 48 at 49 as previously described. The valve member may also, of course, include an opening, as shown in FIG. 5, to facilitate movement of the valve axially within the body member. Similarly, threads 47 may extend the entire length of the passage, if desired, as described with respect to FIG. 3 or may terminate as shown and additional means provided within the bore, such as illustrated in FIG. 3, to secure the valve more firmly when in the male position.

Although the coupling has been specifically described as being coupled to a second coupling of identical design, it will be appreciated that the coupling may be used by itself to couple adjoining members. In such cases, the connection between the coupling and the conduit adjacent the valve stem may be by a threaded opening in the body member or by means of the locking balls illustrated, as long as the piece to be inserted has an annular groove therein.

Other modes of applying the principle of the invention may be employed, change being made as regards the details described, provided the features stated in any of the following claims, or the equivalent of such, be employed.

I therefore particularly point out and distinctly claim as my invention:

1. A coupling device for pipes, conduits and the like comprising a body member having a central opening extending therethrough, a valve member slidably received in said body member, first locking means adjacent one end of said body member for releasably retaining said valve member in a male position projecting outwardly beyond one end of said body member, and a second locking means adjacent the other end of said body member for releasably retaining said valve member in a female position axially inwardly spaced from said one end of said body member, said valve member when in such female position being sufficiently axially inwardly spaced from said first locking means to permit said first locking means to releasably engage the end of another valve member of a similar coupling when in the male position with the outwardly projecting portion of such another valve member received in said one end of said body member, said second locking means comprising an end cap having threaded engagement with said other end of said body member and having an internal threaded portion for connection of an external threaded portion on said valve member.

2. The coupling device of claim 1 further comprising means in said valve member to facilitate rotation of said valve member with respect to said body member for connecting and disconnecting said second locking means.

3. A coupling device for pipes, conduits and the like comprising a body member having a central opening extending therethrough, a valve member slidably received in said body member, first locking means adjacent one end of said body member for releasably retaining said said valve member in a male position projecting outwardly beyond said one end of said body member, and a second locking means adjacent the other end of said body member for releasably retaining said valve member in a female position axially inwardly spaced from said one end of said body member, said valve member when in such female position being sufficiently axially inwardly spaced from said first locking means to permit said first locking means to releasably engage the end of another valve member of a similar coupling when in the male position with the outwardly projecting portion of such another valve member received in said one end of said body member, said second locking means comprising an inernal threaded portion of said body member adjacent said other end for connection of an external threaded portion on said valve member, said first locking means comprising an annular groove in the outer circumference of said valve member intermediate the ends thereof, a plurality of locking balls carried by said body member, and means for retaining said balls in said groove to lock said valve member in the male position.

4. The coupling device of claim 3 further comprising an additional annular groove in the outer circumference of said valve member axially outwardly of said first-mentioned annular groove adapted to receive the locking balls of a similar coupling when said valve member is in the male position with the outwardly projecting portion received in the body member of such similar coupling whose valve member is disposed in the female position.

5. The coupling device of claim 3 further comprising means in said valve member to facilitate rotation of said valve member with respect to said body member for connecting and disconnecting said second locking means.

References Cited

UNITED STATES PATENTS

| 1,286,672 | 12/1918 | Lindgren | 285—39 XR |
| 3,002,769 | 10/1961 | Deubler et al. | 285—39 |
| 3,176,727 | 4/1965 | Rousseau | 251—149.6 XR |
| 3,245,701 | 12/1966 | Leopold et al. | 285—39 XR |
| 3,337,244 | 8/1967 | Appleberry | 137—614.04 XR |

FOREIGN PATENTS

| 95,861 | 1/1898 | Germany. |
| 603,650 | 4/1960 | Italy. |

DANIEL BLUM, Primary Examiner

U.S. Cl. X.R.

137—614.04; 285—12, 316